(12) United States Patent
Hofer, Jr. et al.

(10) Patent No.: US 8,800,492 B1
(45) Date of Patent: Aug. 12, 2014

(54) FEEDER WITH IMPROVED FEED DISPENSING CONTROL

(71) Applicants: George Hofer, Jr., Miller, SD (US); Mark Waldner, Miller, SD (US)

(72) Inventors: George Hofer, Jr., Miller, SD (US); Mark Waldner, Miller, SD (US)

( * ) Notice: Subject to any disclaimer, the term of this patent is extended or adjusted under 35 U.S.C. 154(b) by 24 days.

(21) Appl. No.: 13/737,116

(22) Filed: Jan. 9, 2013

(51) Int. Cl.
*A01K 1/10* (2006.01)

(52) U.S. Cl.
USPC ............................................ 119/57.5; 119/53

(58) Field of Classification Search
USPC .................................... 119/57.5, 57.4, 53, 54
See application file for complete search history.

(56) References Cited

U.S. PATENT DOCUMENTS

| | | | |
|---|---|---|---|
| 3,511,215 A * | 5/1970 | Myers | ............................... 119/53 |
| 4,303,039 A | 12/1981 | Thibault | |
| 4,353,329 A * | 10/1982 | Thibault | ....................... 119/52.1 |
| 4,462,338 A | 7/1984 | Thibault | |
| 4,582,023 A | 4/1986 | Zumbahlen | |
| 4,889,078 A | 12/1989 | Smiley | |
| 5,603,285 A | 2/1997 | Kleinsasser | |
| 5,606,934 A | 3/1997 | Brisby | |
| 5,839,389 A | 11/1998 | Fujii | |
| 5,941,193 A | 8/1999 | Cole | |
| 6,173,676 B1 | 1/2001 | Cole | |
| 6,199,511 B1 | 3/2001 | Thibault | |
| 8,033,248 B2 | 10/2011 | Cole | |
| 2005/0132967 A1 | 6/2005 | Kleinsasser | |

* cited by examiner

*Primary Examiner* — Yvonne Abbott
(74) *Attorney, Agent, or Firm* — Jeffrey A. Proehl; Woods, Fuller, Shultz & Smith, P.C.

(57) ABSTRACT

A feeder apparatus including a frame, a tray on the frame, and a hopper on the frame with an interior for holding feed. The hopper may be positioned above the tray and have a dispensing opening in a lower end to dispense feed into the tray. The apparatus may include a feed flow control assembly extending from the tray into the hopper and including a closing member configured for at least partially restricting feed movement through the dispensing opening. The closing member may be mounted on the tray and positioned in the hopper above the opening to define a gap therebetween. The hopper may be mounted on the frame in a manner that permits adjustment of the proximity of the hopper to the tray to adjust a size of the gap between the closing member and the dispensing opening to control feed flow through the gap.

17 Claims, 14 Drawing Sheets

FEEDER WITH IMPROVED FEED DISPENSING CONTROL

BACKGROUND

Field

The present disclosure relates to livestock feeders and more particularly pertains to a new feeder with improved feed dispensing control for minimizing the opportunity for feed dispensing problems.

SUMMARY

In one aspect, the present disclosure relates to a feeder apparatus comprising a frame, a tray mounted on the frame for receiving feed, and a hopper mounted on the frame and defining an interior for holding a quantity of feed, with the hopper having an upper end and a lower end positioned above the tray. The hopper has a dispensing opening in the lower end to dispense feed into the tray. The apparatus may also comprise a feed flow control assembly configured to control a flow of feed from the hopper to the tray, the control assembly extending from the tray into the lower end of the hopper. The control assembly may include a closing member configured for at least partially restricting movement of feed through the dispensing opening. The closing member may be mounted on the tray and be positioned in the interior of the hopper above the dispensing opening to define a gap between the closing member and the dispensing opening. The hopper may be mounted on the frame in a manner that permits adjustment of the proximity of the hopper to the tray to adjust a size of the gap between the closing member and the dispensing opening to control flow of feed through the gap.

In another aspect, the present disclosure relates to a feeder apparatus comprising a frame, a tray mounted on the frame for receiving feed, and a hopper mounted on the frame and defining an interior for holding a quantity of feed. The hopper may have an upper end and a lower end positioned above the tray, with the hopper having a dispensing opening in the lower end to dispense feed into the tray. The apparatus may also comprise a feed flow control assembly configured to control a flow of feed from the hopper to the tray, the control assembly extending from the tray into the lower end of the hopper. The control assembly may include a closing member configured for at least partially restricting movement of feed through the dispensing opening. The closing member may be mounted on the tray and be positioned at a fixed distance from the tray in the interior of the hopper above the dispensing opening to define a gap between the closing member and the dispensing opening. The apparatus may also comprise an adjustable fastening assembly adjustably mounting the hopper to the frame to permit adjustment of the proximity of the hopper to the tray to adjust a size of the gap between the closing member and the dispensing opening to control flow of feed through the gap.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
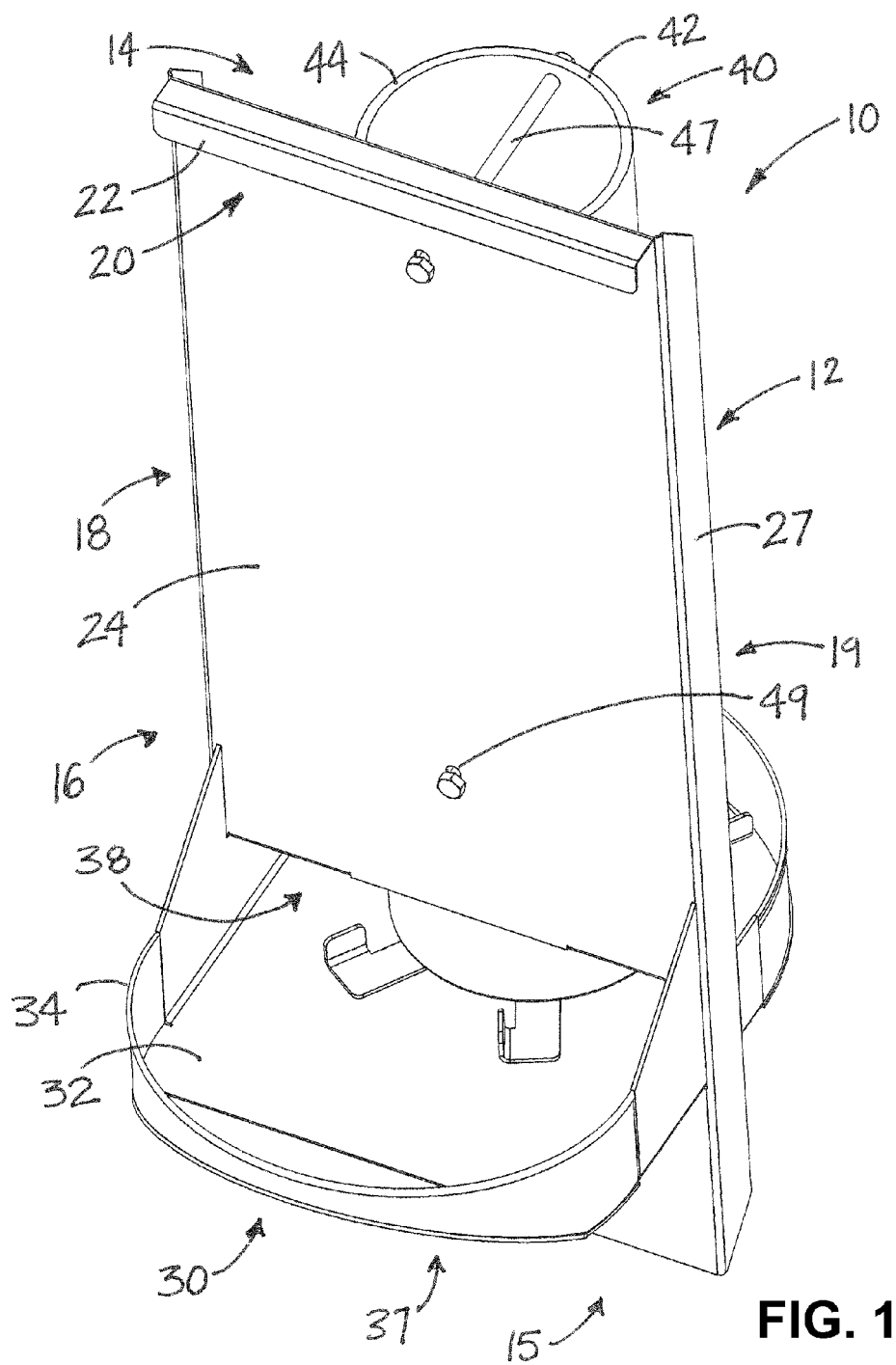
FIG. 1 is a schematic front perspective view of a new feeder with improved feed dispensing control according to the present disclosure.
Figure 2:
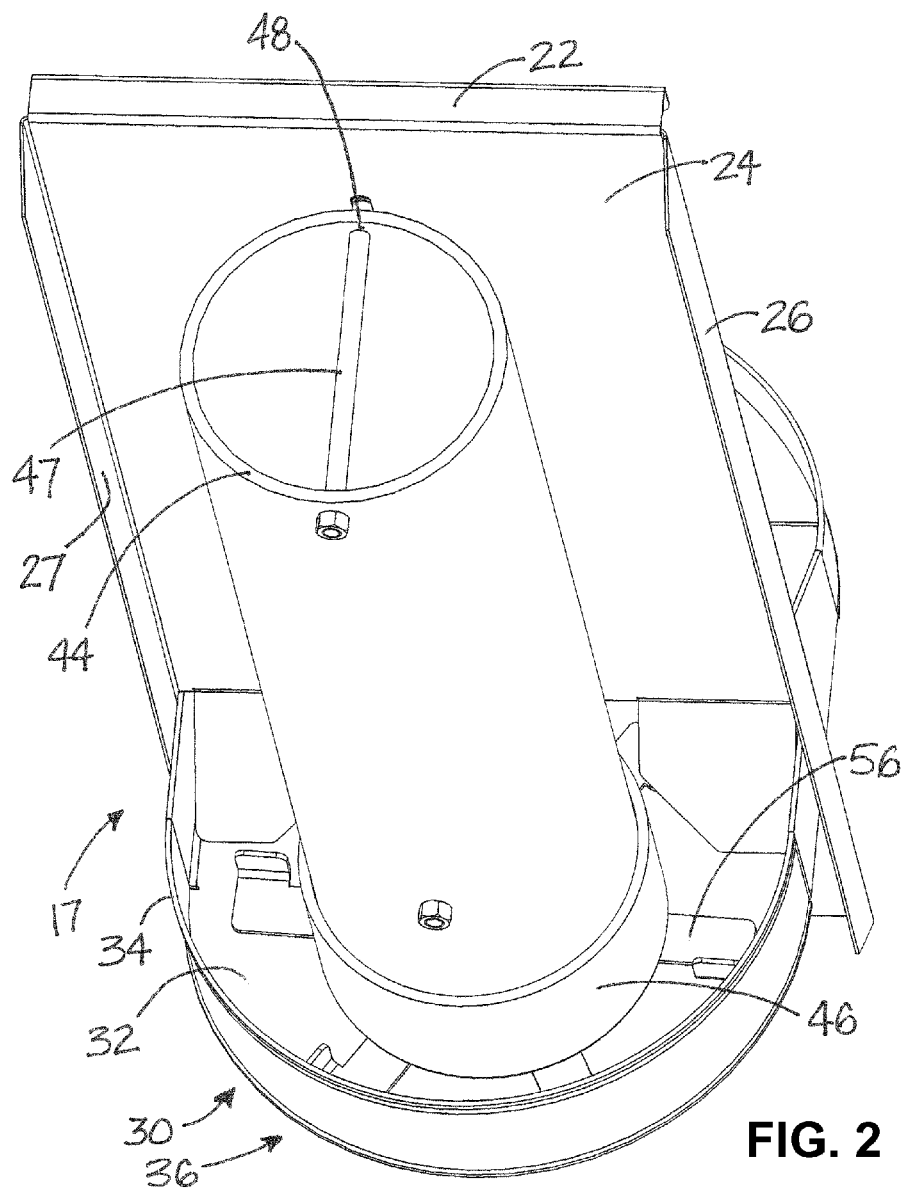
FIG. 2 is a schematic rear perspective view of the feeder according to an illustrative embodiment.
Figure 3:
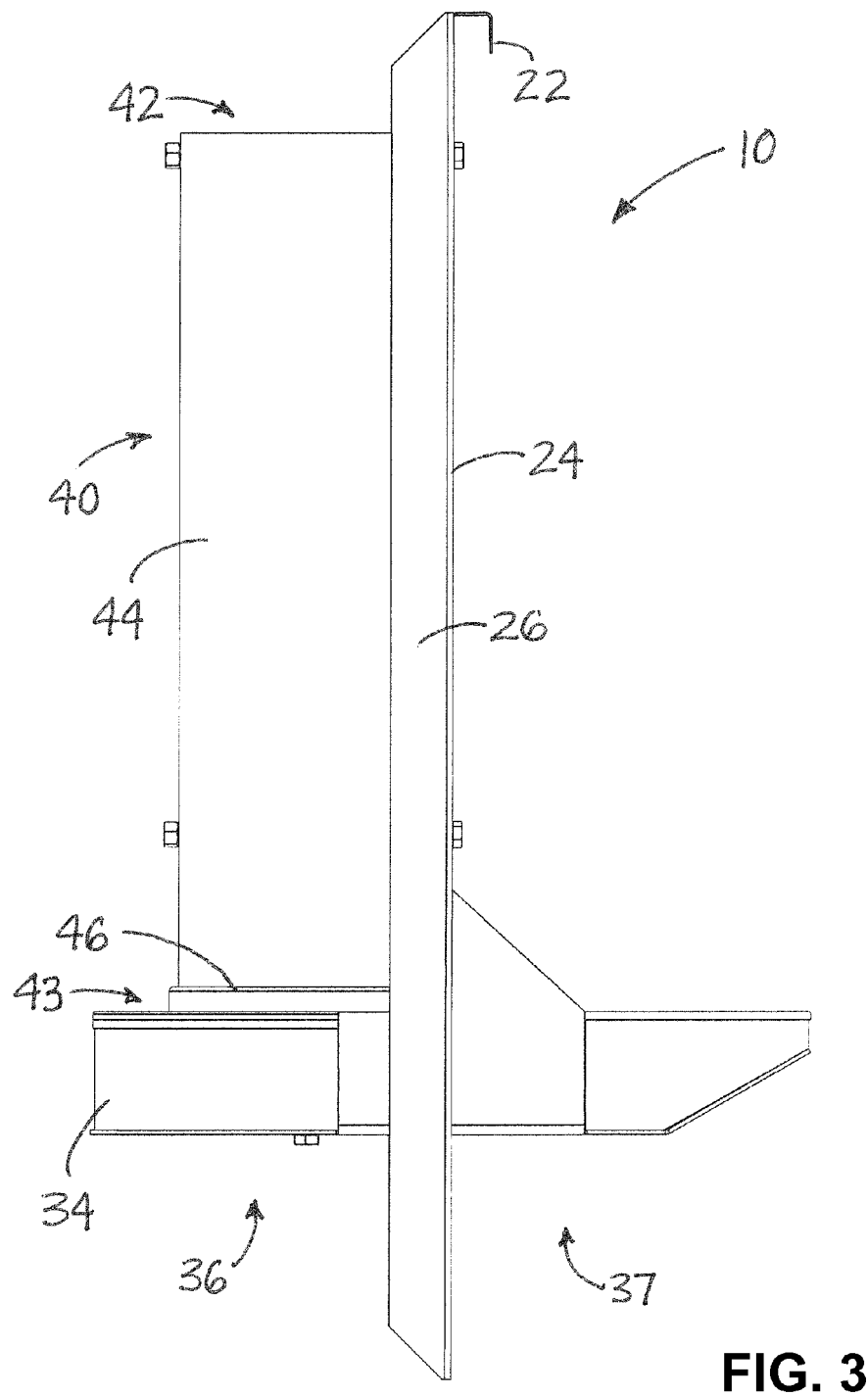
FIG. 3 is a schematic side view of the feeder according to an illustrative embodiment.
Figure 4:
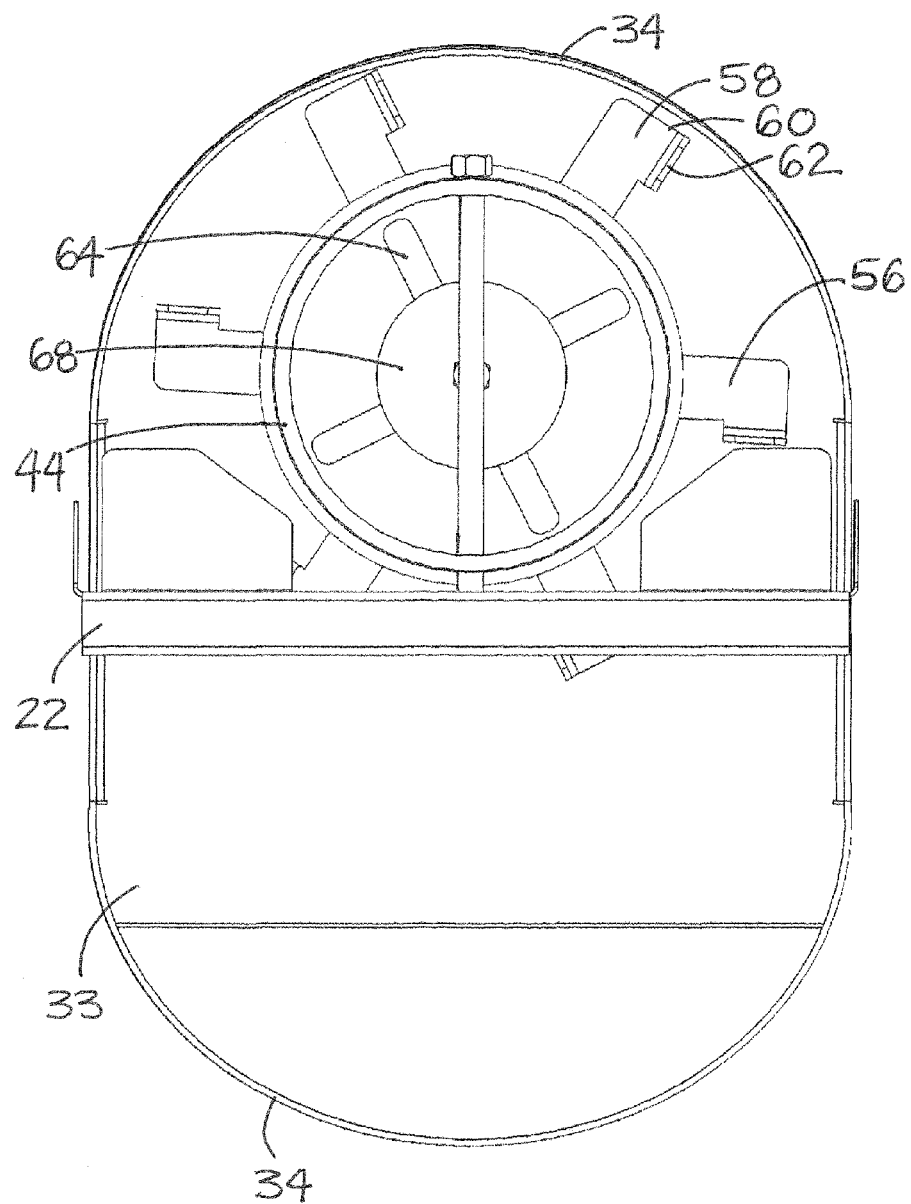
FIG. 4 is a schematic top view of the feeder according to an illustrative embodiment.
Figure 5:
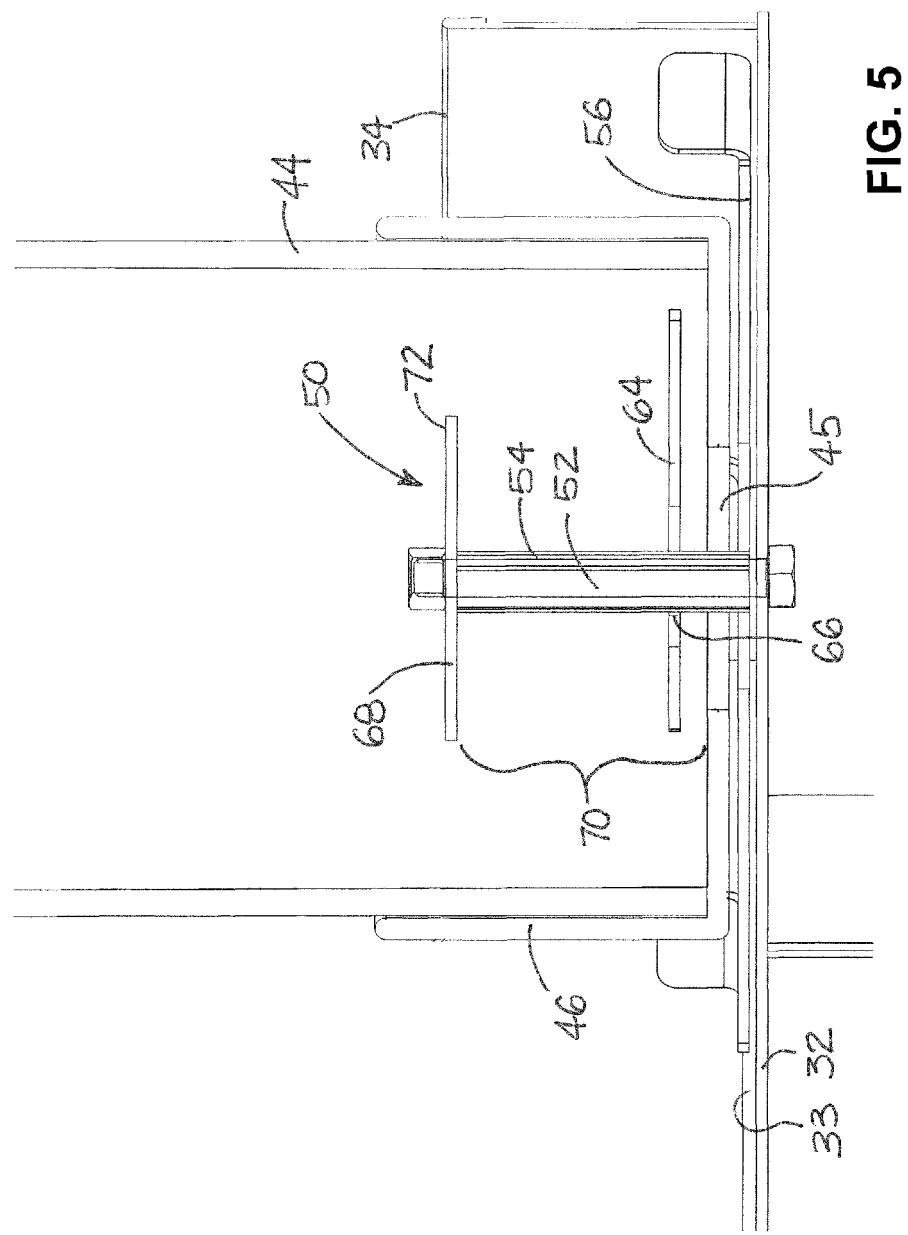
FIG. 5 is a schematic partial sectional view of the feeder taken along line 5-5 of FIG. 4.
Figure 6:
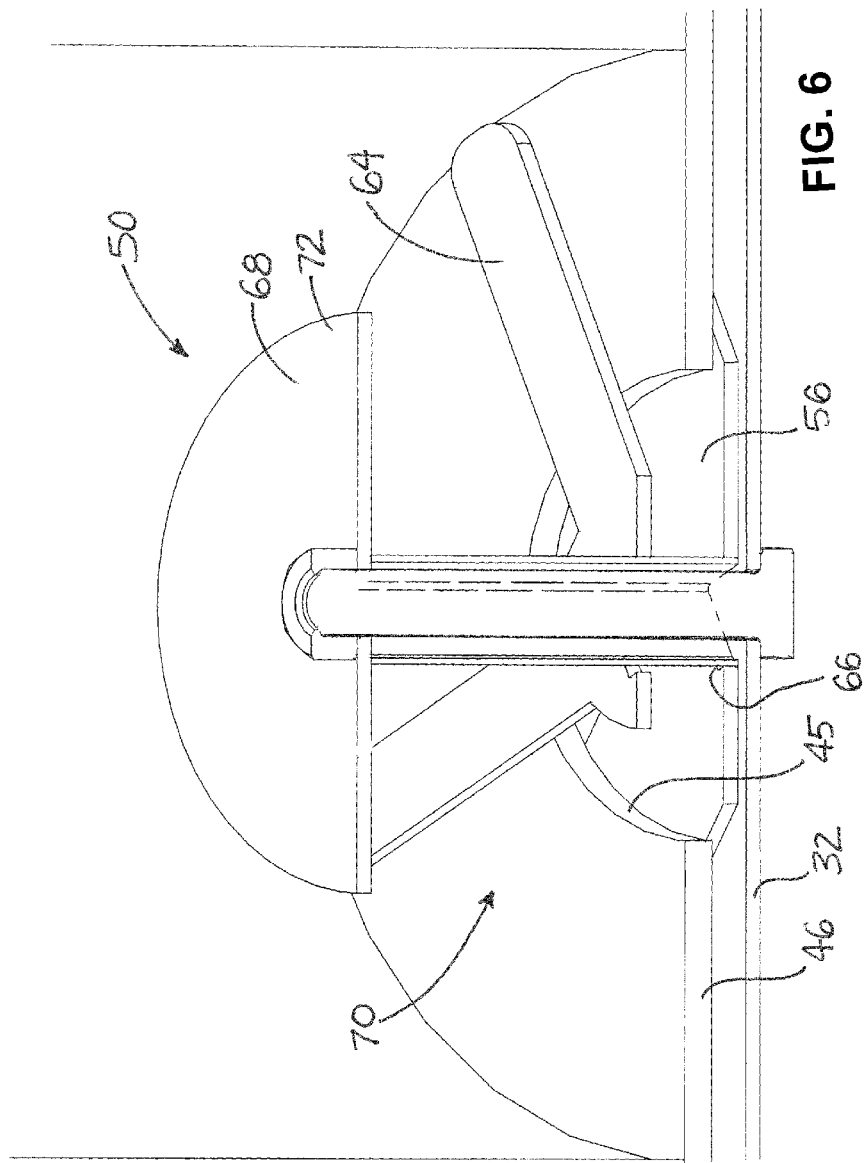
FIG. 6 is a schematic partial perspective sectional view of the feeder.
Figure 7:
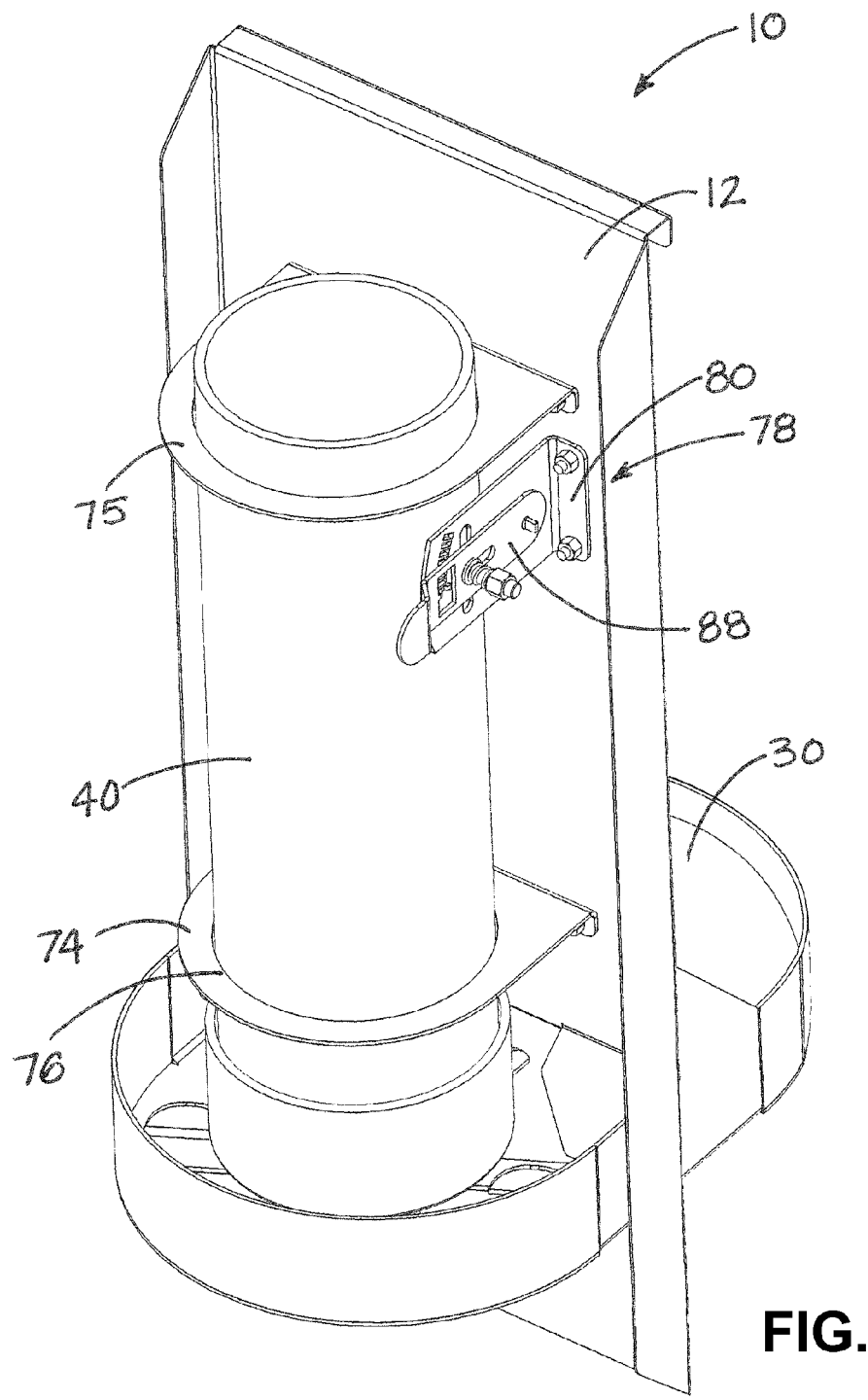
FIG. 7 is a schematic perspective view of the feeder of the disclosure with optional features including an optional adjustable support assembly for the hopper.
Figure 8:
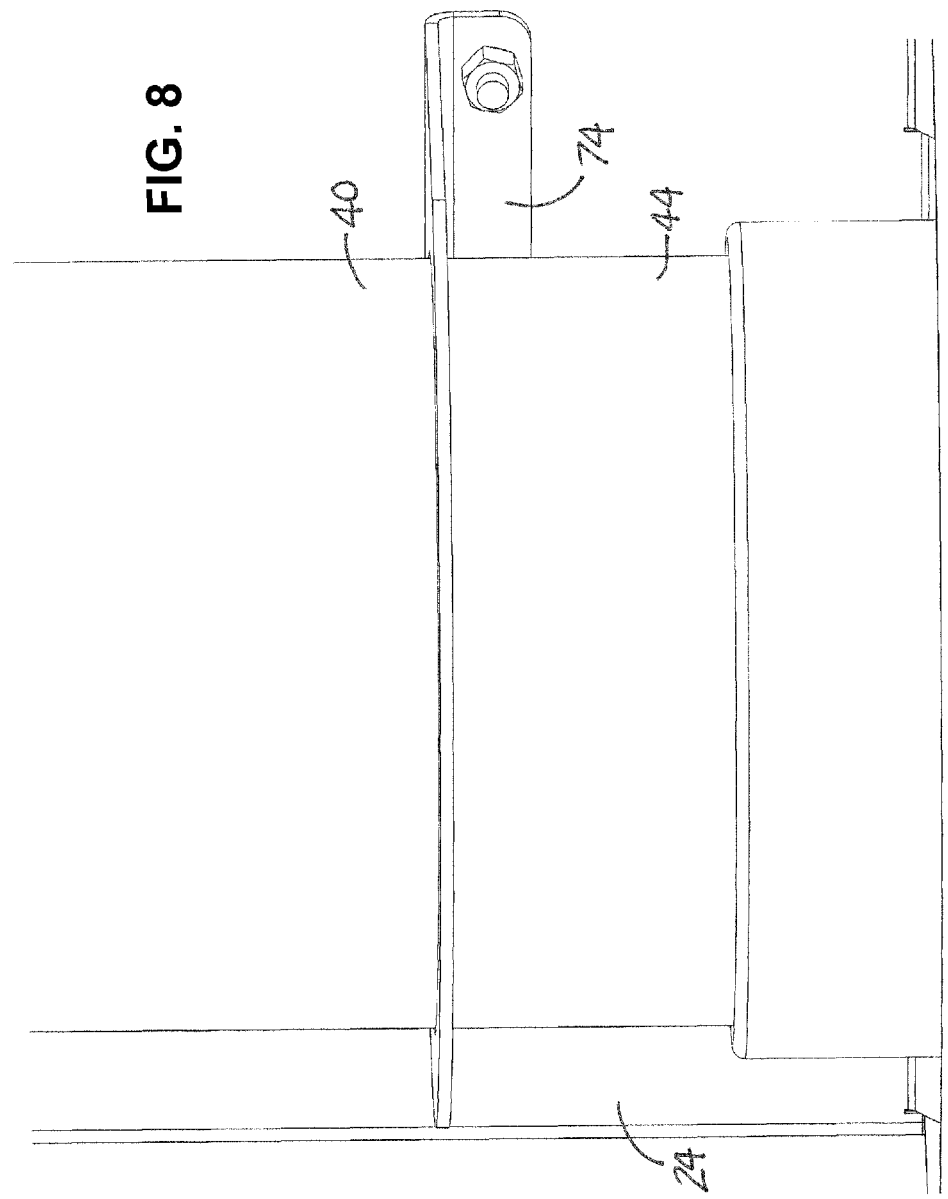
FIG. 8 is a schematic side view of a portion of the feeder showing one of the guide members.
Figure 9:
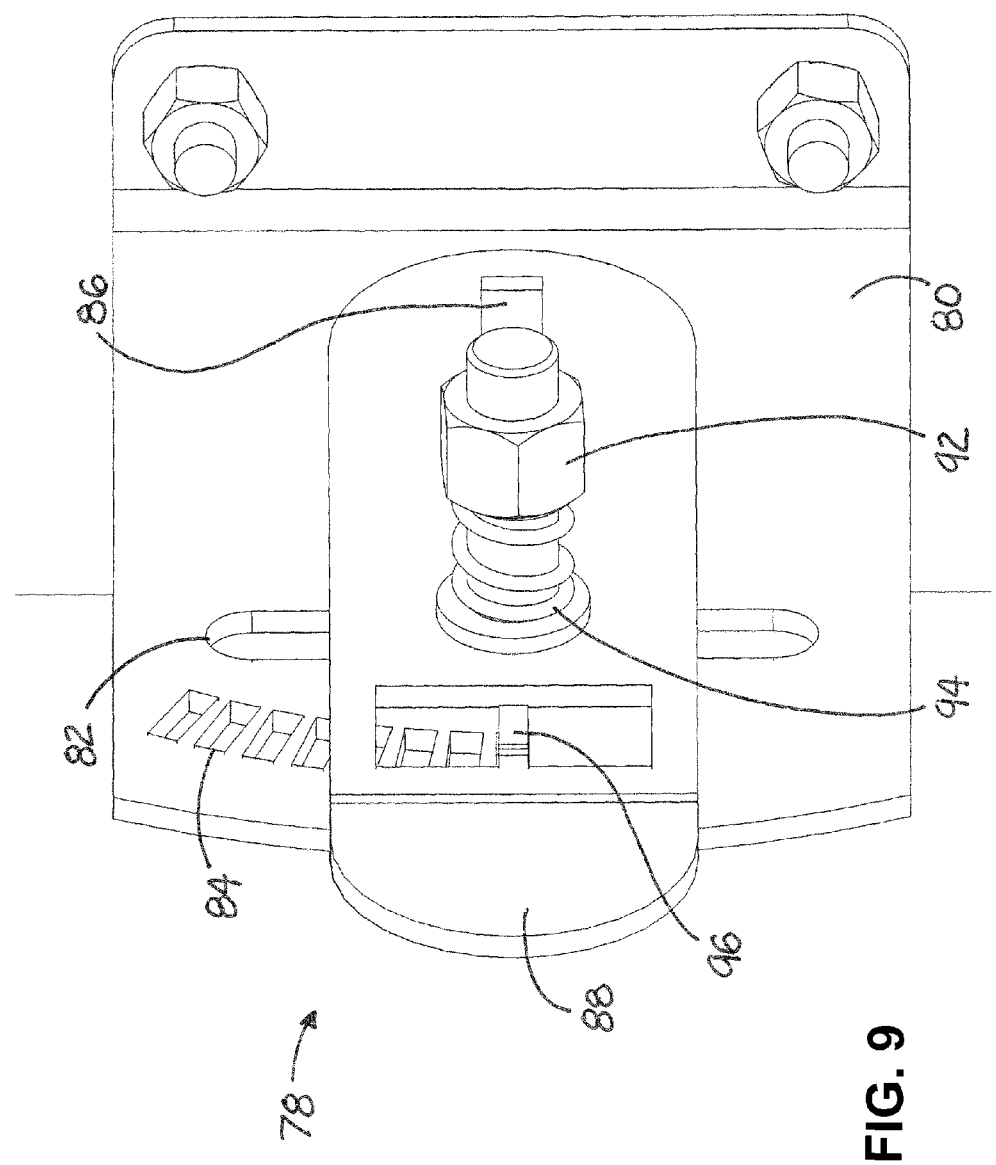
FIG. 9 is a schematic side perspective view of the adjustment mechanism of the adjustable support assembly.
Figure 10:
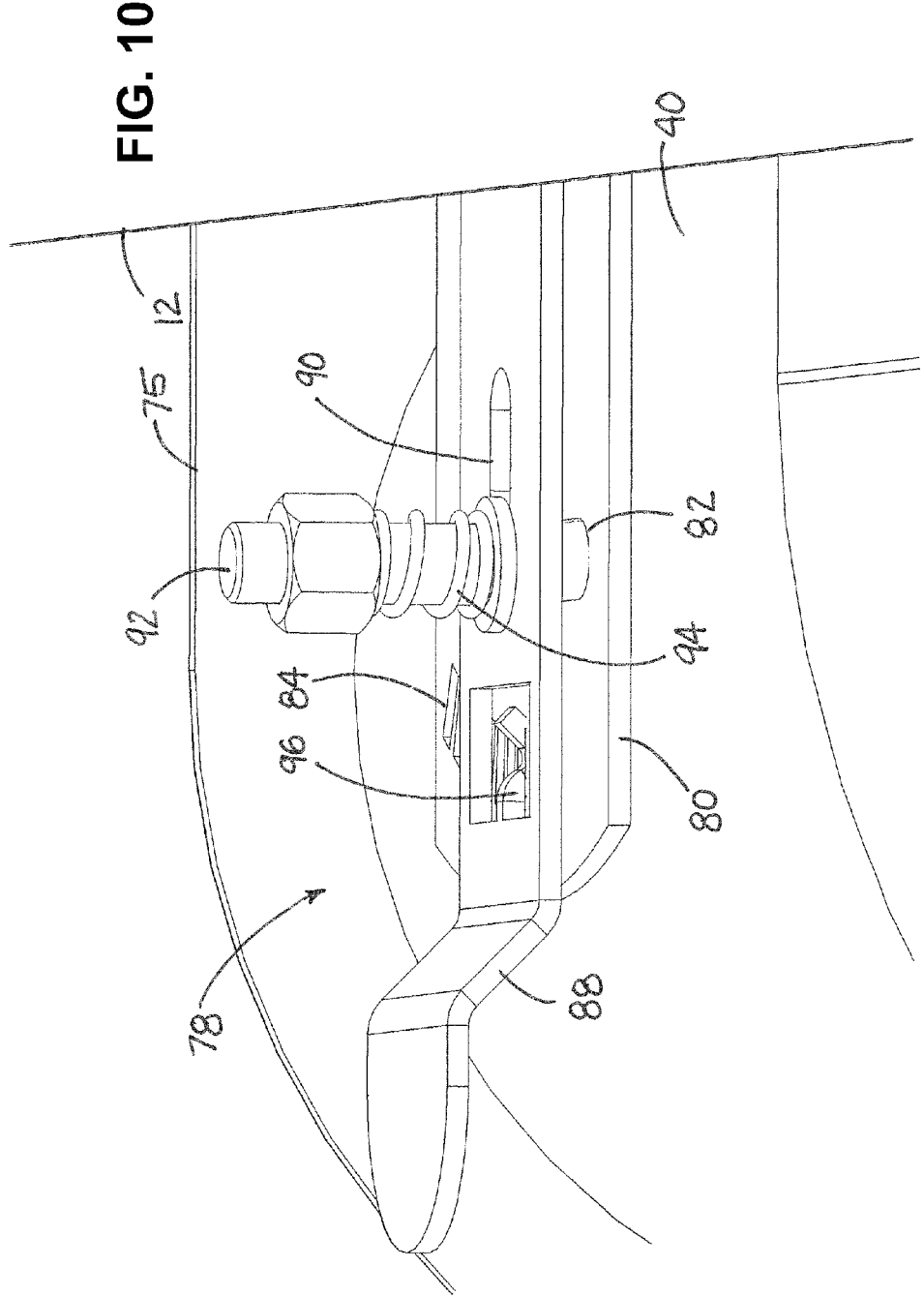
FIG. 10 is a schematic bottom view of the adjustment mechanism of the adjustable support assembly.
Figure 11:
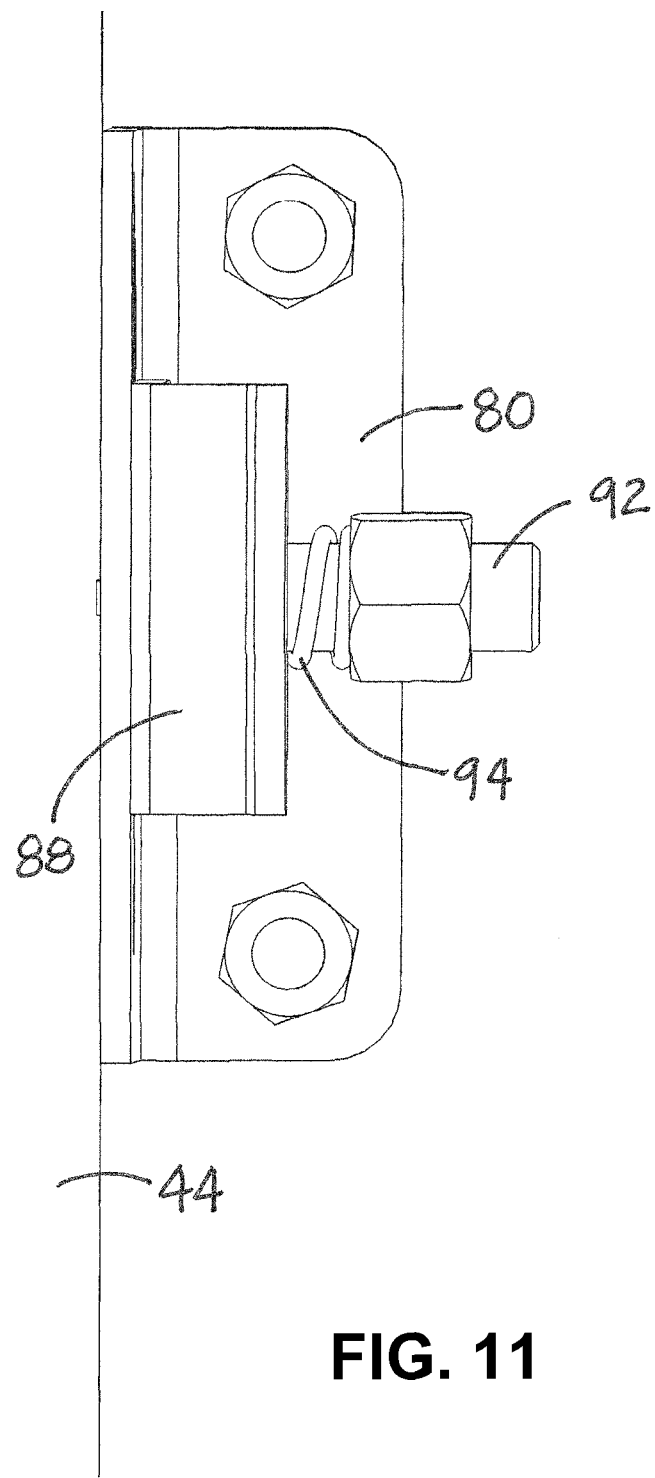
FIG. 11 is a schematic side view of the adjustment mechanism of the adjustable support assembly.

With reference now to the drawings, and in particular to FIGS. 1 through 14 thereof, a new feeder with improved feed dispensing control embodying the principles and concepts of the disclosed subject matter will be described.

The feeder apparatus 10 of the disclosure is primarily intended for the feeding of sows, but it should be recognized that the apparatus, and aspects of the apparatus, may be utilized in feeders for other types of pigs as well for other livestock in general. The feeder apparatus 10 generally comprises a frame 12, a tray 30 to hold a lesser quantity of feed to be eaten by the animal, a hopper 40 that holds a larger quantity of feed prior to moving into the tray, and a feed flow control assembly 50 that provides a degree of control of the rate at which feed is transferred to the tray.

Looking to the feeder apparatus 10 in greater detail, the frame 12 may generally have a top 14, a bottom 15, a front 16, and a rear 17, as well as opposite sides 18, 19. The frame 12 may include a hanger device 20 for suspending the frame 12, and the rest of the apparatus 10, from a structure such as a wall or a horizontally extending member. The hanger device 20 may be located toward the top 14 of the frame such that a majority of the apparatus and weight of the apparatus is located below the hanger device when mounted on the structure. In some embodiments, the hanger device 20 may extend in a forward direction such that the hanger device may be engaged with a structure positioned forwardly of the frame. In the illustrative embodiments, the hanger device 20 may comprise an elongated hook 22 that extends substantially between the sides 18, 19. The frame 12 may generally be comprised of a panel 24 or plate extending between the sides 18, 19 and the top 14 down towards the bottom 15. In some embodiments, the panel 24 may have flanges 26, 27 that are located toward the respective sides 18, 19 of the frame.

The tray 30 may receive and hold a quantity of feed that has been dispensed from the hopper 40 in a manner that the animal is able to reach the feed with the animal's mouth. The tray 30 may be mounted on the frame, and may be generally positioned toward the bottom 15 of the apparatus. The tray 30 may extend forwardly from the frame 12 to provide the animal access for feeding from the tray, and the tray may also extend rearwardly from the frame. The tray 30 may comprise a floor 32 with an upper surface 33 on which the feed rests, and may also include a perimeter lip 34 extending upwardly from the floor 32 to hold the feed on the upper surface 33 of the floor of the tray without significant spillage from the tray. The tray may have a rear portion 36 located rearwardly of the frame 12, and a front portion 37 of the tray being located forwardly of the frame, and in some embodiments the tray may extend through the frame. The perimeter lip 34 on the rear portion may have a substantially semicircular shape in a horizontal plane. A feed gap 38 may be formed in the frame 12 in a location above the floor 32 of the tray so that feed in the rear portion 36 of the tray is able to be moved across the upper surface of the tray to the front portion 37.

The hopper 40 of the apparatus 10 may define an interior for holding a quantity of feed that is available to be dispensed into the tray 30. The hopper 40 generally has an upper end 42 and a lower end 43 positioned adjacent to the tray. The hopper 40 may be mounted on the frame, and may be positioned rearwardly of the frame and extend from near the top to near the bottom of the frame. The hopper 40 may be positioned above the tray 30 to permit feed dispensed from the hopper to fall into the feed tray, and a portion of the hopper may extend down into the interior of the tray, e.g., between portions of the perimeter lip of the tray.

In greater detail, the hopper 40 may comprise a perimeter wall 44 that primarily defines the interior of the hopper. The perimeter wall 44 may be being tubular in character, and may be substantially cylindrical in shape, although this is not critical. In some embodiments, a cap may be employed to cover and removably close the perimeter wall at the upper end of the hopper. The length, or height, of the perimeter wall may be increased or decreased to increase or decrease the capacity of the hopper as desired. A cup 46 may be positioned at the lower end of the hopper to form a bottom of or floor for the hopper. The cup 46 may have a dispensing opening 45 formed therein through which feed from the interior of the hopper is able to fall into the tray. The dispensing opening 45 may have a fixed size and shape which is not adjustable in size or shape. In the illustrative embodiments, the dispensing opening 45 may be substantially circular in shape, although this is not critical.

The hopper 40 may be mounted on the frame 12 in a manner that permits upward and downward adjustment of the vertical position of the hopper with respect to the frame. This vertical adjustability permits adjustment of a distance between the lower end 43 of the hopper and the floor 32 of the tray. To provide the vertical adjustability, an adjustable fastening assembly may be used, and in some embodiments a pair of adjustable fastening assemblies is employed. An illustrative embodiment of an adjustable fastening assembly employs a fastener 47 extending through a hole 48 in the perimeter wall 44 and a slot 49 in the frame 12 to permit sliding of the fastener in the slot with respect to the frame. Upon achieving the desired vertical positioning of the hopper, the fastener may be tightened to secure the hopper position until further repositioning is desired.

The feed flow control assembly 50 may be configured to control a flow of feed from the hopper 40 into the tray 30. The control assembly 50 may be mounted on the tray, and may extend into the lower end 43 of the hopper. In greater detail regarding the illustrative embodiments, the control assembly 50 may comprise a post 52 that may be mounted on the floor 32 of the tray, and may extend upwardly into the lower end 43 of the hopper. To extend into the lower end 43, the post 52 may extend through the dispensing opening 45 in the cup of the hopper. The control assembly 50 may also comprise a sleeve 54 mounted on the post such that the sleeve surrounds at least a portion of the post. The sleeve 54 may be freely rotatable about the post 52.

The control assembly may also include a feed pusher 56 that may be rotatably mounted on the post 52. The feed pusher may generally be engaged or pushed by a portion of the animal's body, such as the snout, to cause rotation of the pusher 56, which operates the feed control assembly 50 as will be further described. The rotation of the feed pusher 56 may also cause feed resting on the upper surface 33 of the floor 32 in the rear portion 36 to be moved or pushed toward the front portion 37 of the tray. The feed pusher 56 may be secured to the sleeve 54 in a manner such that the feed pusher and the sleeve rotate as a unit, and in particular rotation of the pusher causes rotation of the sleeve. The pusher 56 may be positioned between the tray 30 and the hopper 40, and may be positioned above the floor of the tray and below the hopper. In some preferred embodiments, the feed pusher 56 may rest on the upper surface 33 of the floor. A portion of the feed pusher 56 may extend through the dispensing opening 45 to facilitate feed movement from the rear portion 36 to the front portion 37.

Some embodiments of the feed pusher 56 may comprise at least two arms 58 for moving feed across the floor of the tray, and may include four to six or more arms. The arms 58 extend radially outwardly from the post 52 and terminate at an outward end 60. The feed pusher 56 may further include a tab 62 that may be engaged by the snout of the feeding animal attempting to obtain more feed. A tab 62 may be mounted on each of the arms 58, and may be positioned toward the outward ends. The tabs 62 may be upstanding and may have a rounded or even semi-circular profile that tends to prevent the animal from using its snout to lift the arm of the feed pusher. In some of the most preferred embodiments, the perimeter lip 34 of the tray is configured and shaped so that an inward surface of the lip 34 at the rear portion 36 of the tray is positioned close to an outer edge of the tabs 62 as the tabs are moved to minimize any gap therebetween and reduce the possibility of feed being left between the inward surface and tab and not moved to the front portion of the tray by the rotating feed pusher.

The control assembly 50 may include a feed stirrer 64 for stirring feed in the interior of the hopper to cause the feed to be agitated and thus facilitate movement of the feed particles through the dispensing structures. The feed stirrer 64 may be positioned in the interior of the hopper, and may rest upon the inner surface of the cup 46 although this is not critical. The feed stirrer 64 may be mounted on the sleeve 54, and may be configured to rotate with the sleeve. The feed stirrer may also be configured to move along at least a portion of a length of the sleeve 54 inside the interior of the hopper. The feed stirrer may have an aperture 66 through which the sleeve extends, and the sleeve may be relatively freely slidable through the aperture of the feed stirrer. In some illustrative embodiments, the sleeve 54 have a substantially rectangular or square cross sectional shape, and the aperture 66 may have a complementary shape (e.g., rectangular or square) and size so that the sleeve causes the feed stirrer to rotate while allowing the feed stirrer to "float" along a portion of the sleeve to, for example, permit the position of the stirrer to adjust to the vertical adjustment of the hopper.

The control assembly 50 may also comprise a closing member 68 for at least partially restricting movement of feed through the dispensing opening 45. The closing member 68 may be positioned above the dispensing opening 45 to define a gap 70 between the closing member and the dispensing opening. The closing member 68 may be supported a fixed distance from the floor 32 of the tray such that adjustment of the vertical position of the hopper 40 adjusts a size of the gap 70 between the closing member and the dispensing opening to adjust a flow of feed through the gap and the dispensing opening. The closing member 68 may be supported by the post 52, and optionally by the sleeve 54. The closing member may be mounted on an upper end of the post, and may be positioned between a fastener mounted on the post above and the sleeve positioned below the member 68. The closing member 68 may be substantially centered on the dispensing opening 45, and the size and shape of the closing member may be configured with respect to the size and shape of the dispensing opening in the cup such that a perimeter portion 72 of the closing member overlaps a portion of the cup adjacent to a perimeter of the dispensing opening 45. Some of the most preferred embodiments of the closing member comprise a substantially planar plate that is substantially circular in shape, and the dispensing opening is also substantially circular with a diameter that is slightly smaller than the diameter of the closing plate.

The feed flow control assembly 50 may thus control feed flow in two ways, including the vertical position of the hopper with respect to the tray, which fixes the size of the gap 70 between the closing member 68 and the dispensing aperture 45, and the rate at which the animal rotates the feed pusher 56 and as a result the feed stirrer. A larger size of gap 70 and/or more rotation of the feed pusher tend to increase the rate at which feed is dispensed, and a smaller size of the gap and/or less rotation of the feed pusher tends to decrease the rate at which the feed is dispensed. Once the feed falls out of the hopper through the dispensing opening 45, the feeds rests upon the upper surface 33 of the floor of the tray, and the feed pusher 56, moving across the upper surface, tends to engage and push the feed from the rear portion 36 of the tray toward the front portion 37.

As illustratively shown in FIGS. 7 through 11, an optional adjustable support assembly may be utilized to adjust the vertical position of the hopper to adjust the size of the gap 70 between the closing member 68 and the dispensing opening. One or more guides 74 may be utilized to support the hopper in a horizontal direction and guide movement of the hopper in the vertical direction as the vertical position of the hopper is adjusted. The guides 74 may define a guide aperture 76 through which a portion of the hopper perimeter wall 44 extends, and the aperture may be sized to be relatively snug against the outer surface of the perimeter wall.

Additionally, an adjustment mechanism 78 may be utilized to control the vertical position of the hopper 40 relative to the tray 30, and may be used to hold the hopper in one or more discrete vertical positions. Thus, while the embodiments generally shown in FIGS. 1 through 6 allow for a virtually infinite number of vertical position adjustments, the embodiments of FIGS. 7 through 11 permit a finite number of vertical position adjustments that may be more easily repeatable by the user. The adjustment mechanism 78 may include a primary bracket 80 that may be mounted on a relatively stationary element, such as the frame 12 and in some embodiments, the panel 24 of the frame 12. The primary bracket 80 extends rearwardly in a position that is generally adjacent to the perimeter wall 44 of the hopper, and may be located between the lower 74 and upper 75 hopper guides. The primary bracket 80 may include a slot 82 and a plurality of adjustment notches 84 that may be positioned in a curved array. A hinge tab 86 may extend outwardly from the primary bracket.

The adjustment mechanism may also include a selector element 88 for being operated by the hand of the user to select one of the discrete vertical position adjustments for the hopper. The selector element 88 may be mounted on the primary bracket 80 in a manner that permits the selector element to move with respect to the bracket 80, and illustratively the selector element may be mounted on the hinge tab 86 of the primary bracket so that the selector element is able to pivot. The selector element 88 may also include an opening, such as a slot 90, that is alignable with and in registration with the slot 82 in the primary bracket such that a connector 9 may pass through the slots 82, 90. The connector 92 may be further connected to the hopper, or the perimeter wall of the hopper, such that movement of the selector element 88 may be transferred to the hopper and a vertical component of the movement of the elector element causes vertical movement of the hopper. Illustratively, the connector 92 may comprise a fastener, such as a bolt, that extends through the perimeter wall 44 of the hopper and then passes through the slot 82 in the primary bracket and the slot 90 in the selector element. A nut mounted on the bolt may hold the selector element adjacent to the primary bracket 80, and a biasing element, such as a spring, may bias or push the selector element toward and against the primary bracket.

The selector element 88 may be provided with a selector tab 96 that extends from the selector element toward the primary bracket, and is positioned so that the tab may be moved along the array of adjustment notches, and selectively engaged with or inserted into one of the adjustment notches 84 in the primary bracket to select a fixed vertical position of the hopper with respect to the tray. The biasing element 94 may function to press the selector tab into a notch 84 with which it is aligned, while allowing the hand of the user to pull that tab from the notch against the force of the biasing spring to release the tab from the notch and select another notch. Each notch 84 thus provides a discrete vertical position adjustment for the hopper which is easily repeatable and incrementally adjustable between different vertical positions.

The features of the apparatus 10 are better suited to keeping feed in the hopper until needed to be eaten by the animal, which is beneficial in that there is less waste of feed by the animal when feed is dispensed at too fast of a rate. The animal may still obtain sufficient feed by more vigorous rotation of the feed pusher, and the size of the gap 70 may be adjusted by the operator to provide a higher dispensing rate. Further, a slower dispensing rate may decrease the accumulation of feed between the tray and the lower end of the hopper, which can reduce the transmission or wicking of moisture in the tray into the feed still in the hopper, which can cause the feed to cake and clog the dispensing structure and prevent feed flow to the tray. For example, if excess feed flow does lead to wicking of moisture and caking of the feed, then the hopper may be incrementally raised to increase the distance between the dispensing opening of the hopper to make wicking less likely, and also decrease the size of the gap to decrease the rate at which the feed is dispensed to the tray, which can reduce accumulation of the feed below the hopper and also make wicking less likely to occur.

Figure 12:
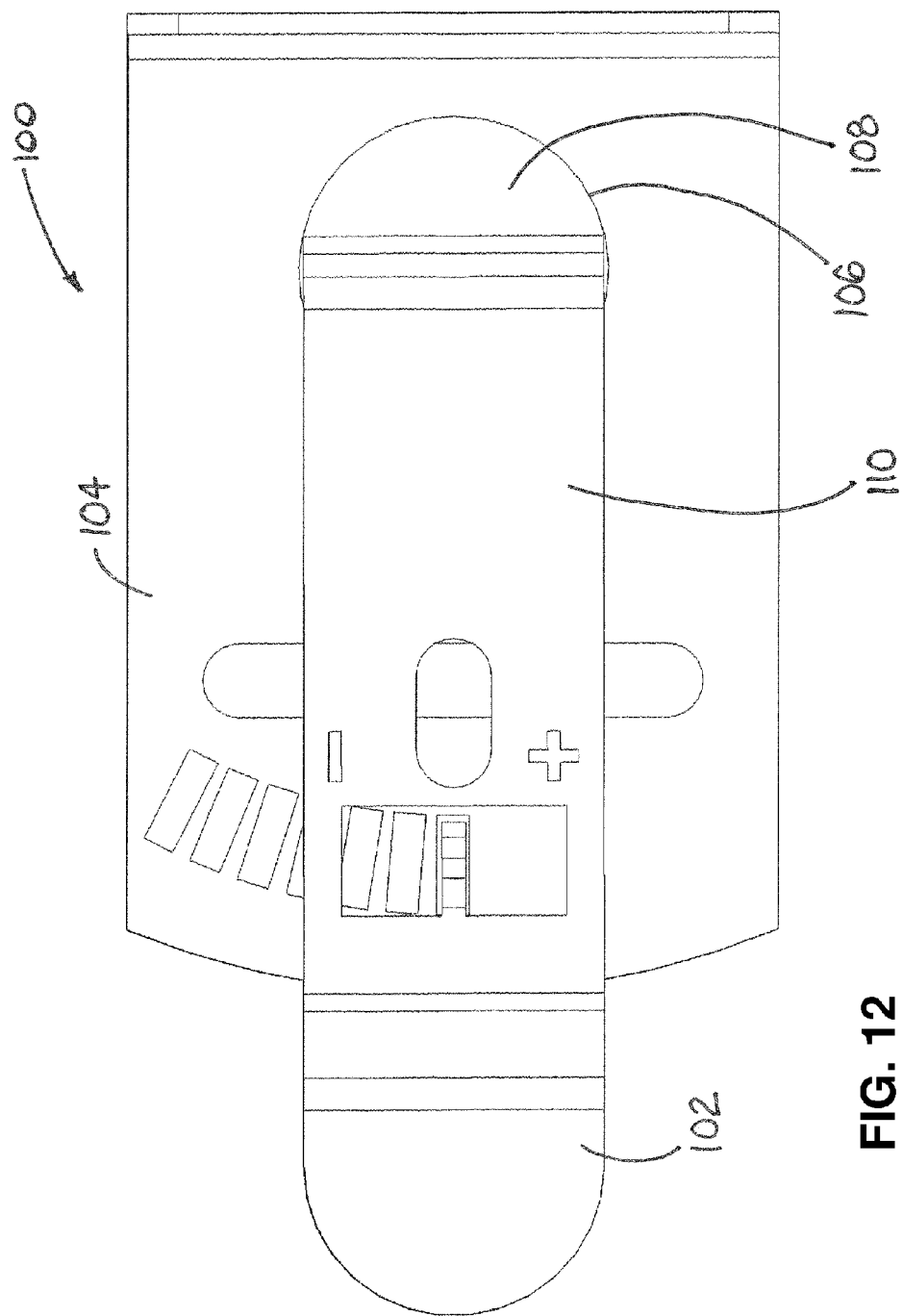
FIG. 12 is a schematic outer side view of an optional adjustment mechanism.
Figure 13:
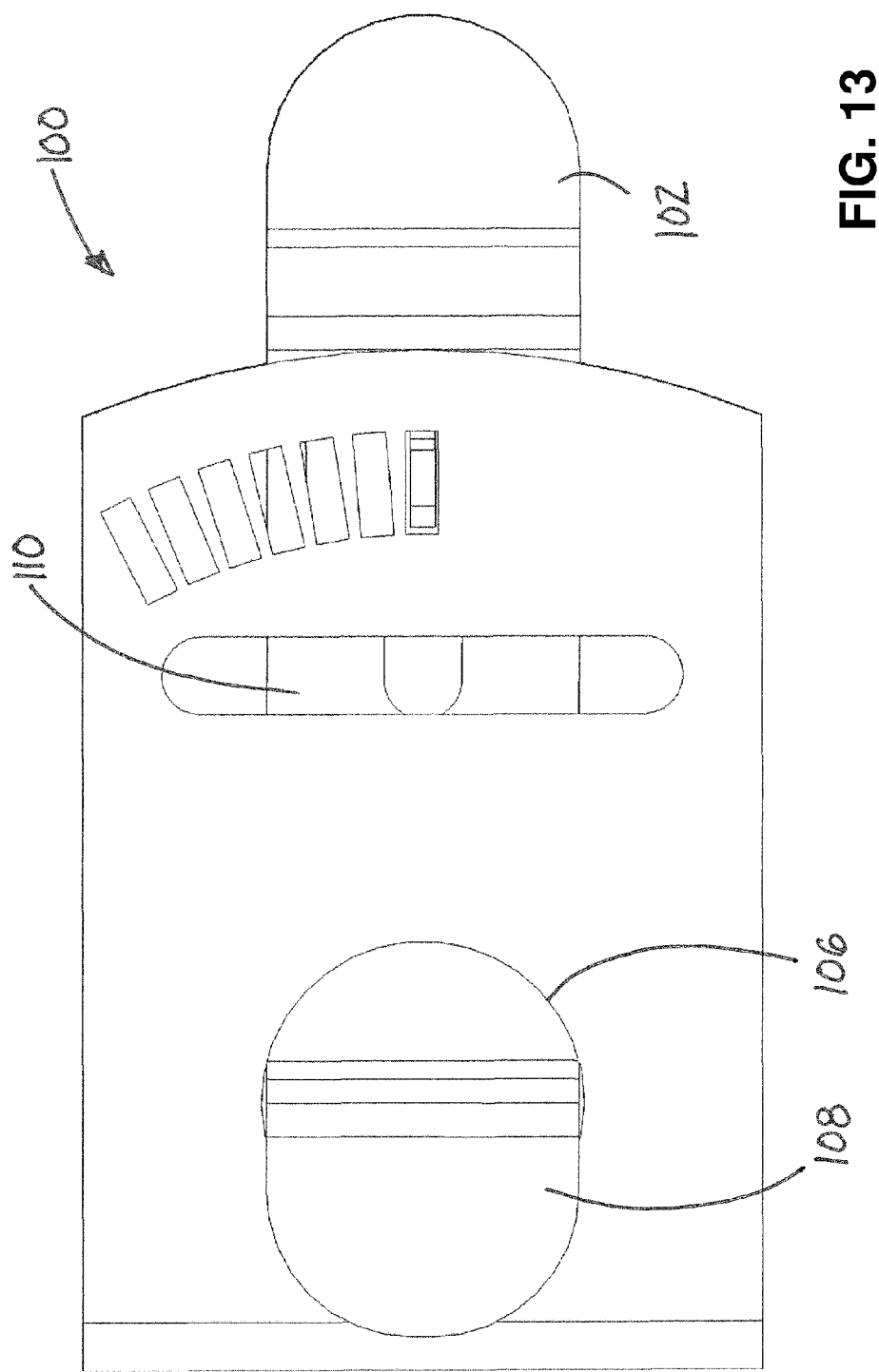
FIG. 13 is a schematic inner side view of an optional adjustment mechanism such as shown in FIG. 12.
Figure 14:
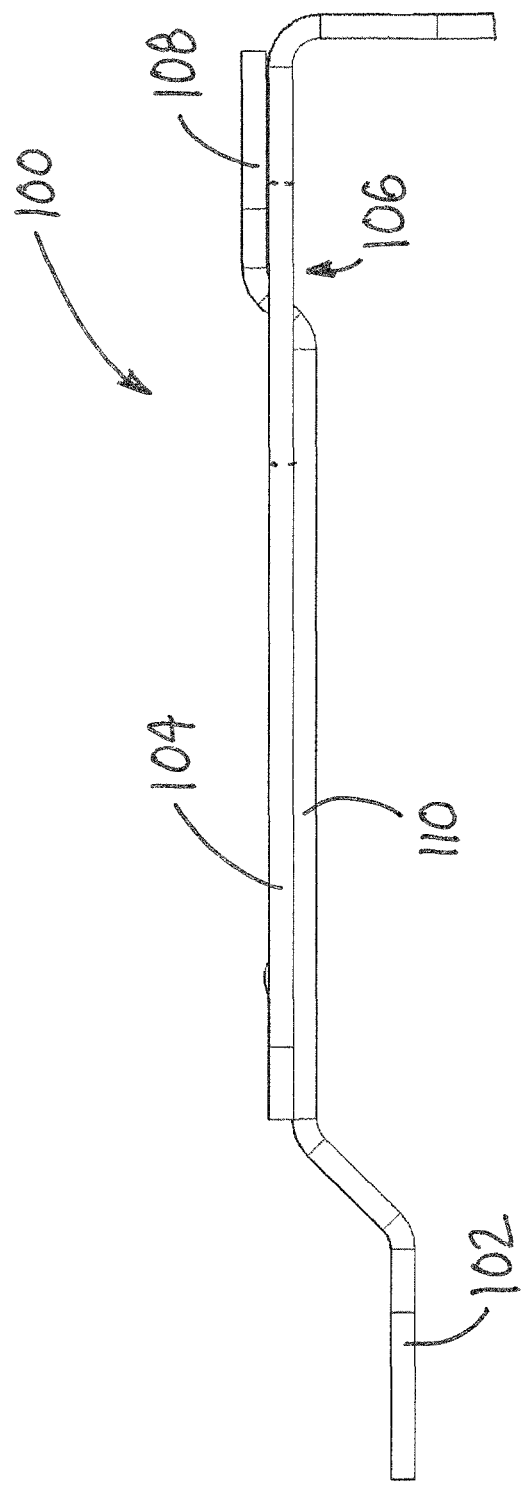
FIG. 14 is a schematic top view of an optional adjustment mechanism such as shown in FIG. 12.

Other variations are possible, including an optional modification of the adjustment mechanism, such as is shown in FIGS. 12 through 14 of the drawings. The optional adjustment mechanism 100 does not include the hinge tab 86 of other embodiments to pivotally mount a selector element 102 to a primary bracket 104 of the mechanism 100. The primary bracket 104 may include a mounting aperture 106 into which a portion of the electro element 102 is inserted. The end portion 108 of the selector element may be offset from the remainder portion 110 of the element 102 such that the end portion may be inserted through the aperture 106 and located on the opposite side of the primary bracket from the remainder portion 110. The selector element 102 is held in the mounting aperture 106 by the connector or fastener and the biasing element. The mechanism 100 otherwise operates in a manner similar to the mechanism 78. The optional configuration of the mechanism 100 avoids the protrusion of the hinge tab, and the selector element 102 is more securely held in place and is thus less likely to be inadvertently released than from the hinge tab.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A feeder apparatus comprising:
a frame;
a tray mounted on the frame for receiving feed;
a hopper mounted on the frame and defining an interior for holding a quantity of feed, the hopper having an upper end and a lower end positioned above the tray, the hopper having a dispensing opening in the lower end to dispense feed into the tray;
a feed flow control assembly configured to control a flow of feed from the hopper to the tray, the control assembly extending from the tray into the lower end of the hopper, the control assembly including a closing member configured for at least partially restricting movement of feed through the dispensing opening, the closing member being mounted on the tray and being positioned in the interior of the hopper above the dispensing opening to define a gap between the closing member and the dispensing opening;
wherein the hopper is mounted on the frame in a manner that permits adjustment of the proximity of the hopper to the tray to adjust a size of the gap between the closing member and the dispensing opening to control flow of feed through the gap.

2. The apparatus of claim 1 wherein the closing member and the dispensing opening are substantially circular in shape and the gap is substantially cylindrical in shape.

3. The apparatus of claim 1 wherein a mounting of the hopper on the frame permits upward and downward adjustment of the vertical position of the hopper with respect to the tray to adjust a distance between the bottom of the hopper and the tray.

4. The apparatus of claim 1 wherein an adjustable fastening assembly mounts the hopper to the frame and allows mounting of the hopper at a plurality of positions on the frame.

5. The apparatus of claim 4 wherein the adjustable fastening assembly comprises at least one fastener extending through a hole in a perimeter wall of the hopper and a slot formed in the frame to permit sliding of the at least one fastener in the slot.

6. The apparatus of claim 1 wherein the closing member is supported by a post at a substantially fixed distance from the tray such that adjustment of the vertical position of the hopper adjusts a size of the gap between the closing member and the dispensing opening to adjust a flow of feed through the gap and the dispensing opening.

7. The apparatus of claim 1 wherein a size of the closing member is slightly larger than a size of the dispensing opening such that a perimeter portion of the closing member is able to overlap a portion of the cup adjacent to a perimeter of the dispensing opening.

8. The apparatus of claim 1 wherein the feed flow control assembly further comprises a post mounted on the floor of the tray and extending upwardly through the dispensing opening into the lower end of the hopper, a sleeve mounted on the post and being freely rotatable about the post, a feed pusher rotatably mounted on the post in a manner such that the feed pusher and the sleeve rotate as a unit, and a feed stirrer positioned in the interior of the hopper for stirring feed in the hopper, the feed stirrer being mounted on the sleeve in a manner such that the feed stirrer rotates with the sleeve such that movement of the feed pusher by a feeding animal causes the feed stirrer to stir feed in the hopper.

9. The apparatus of claim 8 wherein the feed stirrer is configured to move along at least a portion of a length of the sleeve inside the interior of the hopper such that the stirrer moves with the hopper when proximity of the hopper to the tray is adjusted.

10. The apparatus of claim 8 wherein the feed pusher comprises a plurality of arms extending radially outwardly from the post in the tray for moving feed across the floor of the tray, and a tab extending upwardly from each of the arms for being engaged by a snout of an animal attempting to obtain feed.

11. The apparatus of claim 1 wherein a rear portion of the tray is located rearwardly of the frame and a front portion of the tray is located forwardly of the frame, the hopper being positioned above the rear portion of the tray.

12. The apparatus of claim 1 wherein the frame includes a hanger device for suspending the frame from a structure.

13. The apparatus of claim 1 wherein the hopper comprises a tubular perimeter wall and a cup positioned at the lower end of the hopper to form a bottom of the hopper, the dispensing opening being formed in the cap.

14. The apparatus of claim 1 additionally comprising an adjustable support assembly configured to provide a plurality of discrete vertical position adjustments for the hopper to adjust the size of the gap between the closing member and the dispensing opening to control flow of feed through the gap.

15. The apparatus of claim 14 wherein the adjustable support assembly comprises an adjustment mechanism providing a finite number of vertical position adjustments for the hopper.

16. A feeder apparatus comprising:
a frame;
a tray mounted on the frame for receiving feed;
a hopper mounted on the frame and defining an interior for holding a quantity of feed, the hopper having an upper end and a lower end positioned above the tray, the hopper having a dispensing opening in the lower end to dispense feed into the tray;
a feed flow control assembly configured to control a flow of feed from the hopper to the tray, the control assembly extending from the tray into the lower end of the hopper, the control assembly including a closing member configured for at least partially restricting movement of feed through the dispensing opening, the closing member being mounted on the tray and being positioned at a fixed distance from the tray in the interior of the hopper above the dispensing opening to define a gap between the closing member and the dispensing opening; and
an adjustable fastening assembly adjustably mounting the hopper to the frame to permit adjustment of the proximity of the hopper to the tray to adjust a size of the gap between the closing member and the dispensing opening to control flow of feed through the gap.

17. The apparatus of claim 16 wherein the adjustable fastening assembly comprises at least one fastener extending through a hole in a perimeter wall of the hopper and a slot formed in the frame to permit sliding of the at least one fastener in the slot.

* * * * *